United States Patent
Deitiker et al.

(10) Patent No.: US 9,691,061 B2
(45) Date of Patent: Jun. 27, 2017

(54) METHOD AND SYSTEM FOR ELECTRONIC TOLL PAYMENT

(75) Inventors: Glenn Deitiker, Austin, TX (US); J. Chris George, Round Rock, TX (US); Shannon Fuentes Swank, Austin, TX (US)

(73) Assignee: BANCPASS, INC, Austin, TX (US)

(*) Notice: Subject to any disclaimer, the term of this patent is extended or adjusted under 35 U.S.C. 154(b) by 649 days.

(21) Appl. No.: 12/859,113

(22) Filed: Aug. 18, 2010

(65) Prior Publication Data
US 2011/0047009 A1    Feb. 24, 2011

Related U.S. Application Data

(60) Provisional application No. 61/234,872, filed on Aug. 18, 2009.

(51) Int. Cl.
G07B 15/02    (2011.01)
G06Q 20/26    (2012.01)
G07B 15/06    (2011.01)

(52) U.S. Cl.
CPC .......... *G06Q 20/26* (2013.01); *G07B 15/063* (2013.01)

(58) Field of Classification Search
CPC .... G07B 150/063; G07B 15/06; G08G 1/017; G08G 1/0175
USPC ........................................................ 705/13
See application file for complete search history.

(56) References Cited

U.S. PATENT DOCUMENTS

| | | | |
|---|---|---|---|
| 4,555,618 A * | 11/1985 | Riskin ........................... | 235/384 |
| 6,140,941 A * | 10/2000 | Dwyer et al. ................. | 340/928 |
| 6,219,613 B1 * | 4/2001 | Terrier et al. ................. | 701/408 |
| 6,553,131 B1 * | 4/2003 | Neubauer et al. ............ | 382/105 |
| 6,661,352 B2 * | 12/2003 | Tiernay et al. ............... | 340/928 |
| 6,850,898 B1 * | 2/2005 | Murakami et al. ............ | 705/13 |
| 6,968,319 B1 * | 11/2005 | Remington et al. ........... | 705/40 |
| 7,114,651 B2 * | 10/2006 | Hjelmvik ....................... | 235/384 |
| RE39,736 E * | 7/2007 | Morrill, Jr. ..................... | 705/44 |
| 7,533,809 B1 * | 5/2009 | Robinson et al. ............. | 235/382 |
| RE41,085 E * | 1/2010 | Anthonyson ..................... | 701/1 |
| 8,019,629 B1 * | 9/2011 | Medina et al. .................... | 705/4 |
| 8,364,583 B1 * | 1/2013 | Mussman et al. .............. | 705/39 |
| 2002/0140577 A1 * | 10/2002 | Kavner ......................... | 340/933 |
| 2003/0115095 A1 * | 6/2003 | Yamauchi ....................... | 705/13 |
| 2004/0094619 A1 * | 5/2004 | Silberberg .................... | 235/382 |
| 2004/0119609 A1 * | 6/2004 | Solomon ....................... | 340/928 |
| 2004/0167861 A1 * | 8/2004 | Hedley .......................... | 705/400 |
| 2005/0006457 A1 * | 1/2005 | Nakajima ..................... | 235/379 |
| 2005/0057373 A1 * | 3/2005 | Noguchi .................... | 340/932.2 |

(Continued)

OTHER PUBLICATIONS www.bethesdatransit.org/p-pay-on-foot.shtml.*

(Continued)

*Primary Examiner* — Brian Epstein

(74) *Attorney, Agent, or Firm* — DuBois, Bryant & Cambell, LLP; William D. Wiese

(57) ABSTRACT

A system and method for making electronic payments for tolls, parking and related transactions. A customer downloads an application onto their personal electronic device and registers the customer's vehicle and financial account information with a provider. The application detects upcoming toll facilities and notifies the customer. The customer can accept the payment of the toll through the application whereupon the provider makes a payment from the customer's designated account to the toll facility.

16 Claims, 1 Drawing Sheet

(56) References Cited

U.S. PATENT DOCUMENTS

| | | | |
|---|---|---|---|
| 2005/0125284 A1* | 6/2005 | Fairbaugh | 705/13 |
| 2005/0197976 A1* | 9/2005 | Tuton et al. | 705/417 |
| 2006/0056658 A1* | 3/2006 | Kavner | 382/105 |
| 2006/0094411 A1* | 5/2006 | Dupont | 455/417 |
| 2006/0250278 A1* | 11/2006 | Tillotson et al. | 340/932.2 |
| 2006/0278705 A1* | 12/2006 | Hedley et al. | 235/384 |
| 2007/0008179 A1* | 1/2007 | Hedley et al. | 340/928 |
| 2007/0124198 A1* | 5/2007 | Robinson et al. | 705/13 |
| 2007/0174344 A1* | 7/2007 | Goh et al. | 707/200 |
| 2007/0285280 A1* | 12/2007 | Robinson et al. | 340/928 |
| 2008/0059351 A1* | 3/2008 | Richey et al. | 705/35 |
| 2008/0147491 A1* | 6/2008 | Robinson et al. | 705/13 |
| 2008/0175438 A1* | 7/2008 | Alves | 382/105 |
| 2008/0177661 A1* | 7/2008 | Mehra | 705/44 |
| 2009/0125341 A1* | 5/2009 | Somoza et al. | 705/5 |
| 2009/0192936 A1* | 7/2009 | Takahashi | 705/41 |
| 2009/0236200 A1* | 9/2009 | Hallowell et al. | 194/215 |
| 2009/0261988 A1* | 10/2009 | Ramirez Serrano | 340/932.2 |
| 2010/0030629 A1* | 2/2010 | Ward, II | 705/13 |
| 2010/0085214 A1* | 4/2010 | Kim | 340/932.2 |
| 2010/0090865 A1* | 4/2010 | Dasgupta | 340/932.2 |
| 2010/0191584 A1* | 7/2010 | Fraser et al. | 705/13 |
| 2010/0211440 A1* | 8/2010 | Leshem | 705/13 |
| 2010/0280956 A1* | 11/2010 | Chutorash et al. | 705/64 |
| 2011/0035261 A1* | 2/2011 | Handler | 705/13 |

OTHER PUBLICATIONS

Fitzgerald, Michael, Use Your Cell Phone Instead of Your Credit Card, Sep. 19, 2005, PCWorld.*
www.paymentsnews.com/2008/05/pay-by-mobile-p.html.*

* cited by examiner

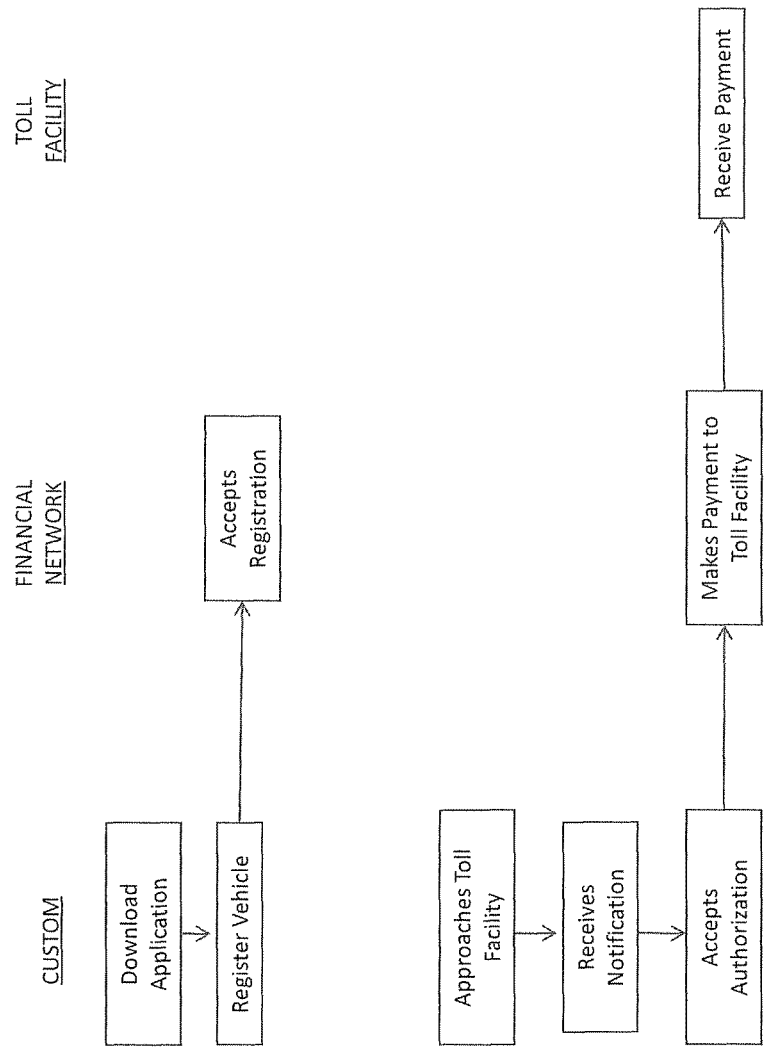

METHOD AND SYSTEM FOR ELECTRONIC TOLL PAYMENT

PRIORITY STATEMENT UNDER 35 U.S.C. §119 & 37 C.F.R. §1.78

This non-provisional application claims priority based upon prior U.S. Provisional Patent Application Ser. No. 61/234,872 filed Aug. 18, 2009 in the name of Glenn Deitiker, J. Chris George, Shannon Fuentes Swank and Mark Swank entitled "Vehicle Transaction System and Method," the disclosure of which is incorporated herein in its entirety by reference.

BACKGROUND OF THE INVENTION

Traditional systems offer little customer choice for method of payment at unmanned toll locations. For toll facilities in particular, open road tolling (ORT) systems process vehicles at highway speeds with no opportunity to use a cash or coin machine for payment. Traditional ORT systems use active or passive methods for identifying customers including radio frequency transponders or visual images of the vehicle license plate among others. Toll systems traditionally use a stored value account for each customer requiring an initial deposit to apply to future transactions. Before the stored value account is fully depleted, it is replenished from a customer's bank account, credit card or cash payment at a service center. This is an inconvenient system at best for infrequent users of a toll system. Users of multiple regional toll systems may be required to open several accounts. There is a need, therefore, for an improved method of electronic payment in open road tolling and other similar environments.

SUMMARY OF THE INVENTION

An electronic payment system enables payment for transactions at locations such as toll roads, parking structures and drive-through service windows. The financial network system provides a service allowing customers to register one or more vehicles using a mutually accepted method of identification and to make or confirm a payment through a personal electronic device.

The financial network system provides customers the ability to choose the method of payment for vehicle transaction systems either when unattended, electronic processing of transactions is the only method available or when a choice of unattended or attended transactions is available. The system does not require a stored value account but one may be available.

In one embodiment of the invention, the customer downloads an application from a provisioner for their personal electronic device. The application provides a registration process for linking financial accounts to the financial network tied to the customer's account. The application accepts customer information and financial account information and securely transmits to the financial network. The customer may enter more than one account, such as a credit card or bank account. The customer may enter license plate information for several personally owned vehicles and associates each with a financial account using the application. This vehicle and account registration is sent to the financial network. The customer drives toward a toll entry point and application on the personal electronic device announces the approaching toll authority. The customer accepts the impending toll through the device using voice command or button press. The application communicates the authorization to the financial network which settles payment with the toll system.

In another embodiment, the customer registers a credit card, bank account and/or a stored value account with the financial network. The customer uses the toll system and, for example, has preselected the bank account to pay for tolls. The toll system detects the license plate and requests payment from the financial network after the toll occurs. The financial network sends the request for payment authorization to the customer's personal electronic device. The customer authorizes payment with the default account, or authorizes payment through a separate account. The financial network settles the transaction with the toll system and charges customer's bank account for the toll.

In another embodiment, the customer has registered with the financial network using the downloaded application. The customer has a credit card and bank account registered on the financial network. The customer rents a car and adds the car's license plate to the application with an expiration date three days later. The application notifies the financial network of the addition. The customer uses a toll system and has preselected the bank account to pay for tolls. The toll system detects the license plate for the rental car and requests payment from the financial network the day after the toll occurs which is after the rental car is returned. The financial network sends the request for payment authorization to the customer's personal electronic device. The application notifies the user of the rental car period and that the transaction occurred when the car was active with the application. The customer authorizes payment with the default account which is the registered bank account. The financial network settles the transaction with the toll system and charges customer's bank account for the toll.

The foregoing has outlined rather broadly certain aspects of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which:

FIG. 1 is a flow diagram showing the payment process for a customer in one embodiment of the invention.

DESCRIPTION OF THE PREFERRED EMBODIMENTS

The present invention is directed to improved methods and systems for electronic toll payment. The configuration and use of the presently preferred embodiments are discussed in detail below. It should be appreciated, however, that the present invention provides many applicable inventive concepts that can be embodied in a wide variety of contexts other than traditional electronic toll collection, such as parking structures and drive through service windows. Accordingly, the specific embodiments discussed are merely illustrative of specific ways to make and use the invention, and do not limit the scope of the invention. In addition, the following terms shall have the associated meaning when used herein:

"application" means a software, firmware or other application capable of operating on a personal electronic device;

"automatic clearing house" means an electronic financial network for financial transactions used by the banking system;

"back-office system" means a system that processes and clears electronic transactions at a central location;

"electronic tolling" means the use of electronic identification to process vehicle transactions on a toll road, parking structure or other vehicle service;

"financial account" means an account with a bank, credit card or a stored value account registered to an account owner;

"financial network" means a service network providing financial services applicable to vehicle transactions for one or more toll facilities using one or more financial accounts;

"global positioning system" or "GPS" means a satellite service provided to consumers to determine their location on the earth with high accuracy;

"hardware token" means an electronic code to authenticate a person or device stored on an electronic device such as a USB key that is dedicated to storing the token;

"image transaction" means a vehicle transaction on a system where the vehicle is identified from an image of the license plate;

"IP address" means the Internet Protocol (IP) number used as an electronic identifier in a networked system environment such as a local network or the Internet;

"multimedia messaging service" or "MMS" means an electronic message including multimedia including but now limited to images, sounds and full motion video;

"open road tolling" or "ORT" means a system that allows vehicle transactions to be processed at highway speeds without customer interaction;

"personal electronic device" means a mobile phone, personal digital assistant, two way pager, or other device capable of receiving and transmitting electronic communications.

"short message service" or "SMS" means an electronic text message to or from a personal electronic device such as a phone;

"software token" means an electronic code to authenticate a person or device stored in an electronic system such as a phone SIM card, magnetic disk or flash drive that is not dedicated to storing the token;

"payment card industry" or "PCI" means debit card, credit card, gift cards or other point of sale devices;

"registered plate" means a license plate that a customer has registered with a toll system;

"unregistered plate" means a license plate that a customer has not registered with a toll system but acquired image based transactions;

"vehicle identification number" or "VIN" means the unique number issued by a manufacturer to each motor vehicle;

"voice control" means a feature on a personal electronic device allowing the user to interact with voice commands for hands-free usage; and "X509" means a digital certificate standard for storing identity information of a device or person that is issued and authenticated by a Certificate Authority.

Registration Process

To register with the financial network, the consumer installs an application on their personal electronic device which becomes the primary means of payment authorization. The application interfaces with electronic features of the device including but not limited to GPS, camera, voice control and networking. During installation, the application will register the owner of the device using the primary identifier on the device such as a telephone number, IP address or manufacturer's serial number. In some embodiments, the personal electronic device will be provisioned with a digital certificate to authenticate the owner of the account during all electronic transactions from the device. All application features will be registered to the appropriate device components such as the camera, GPS and networking interface.

In order to process payments, the owner of the device is required to register one or more payment methods to use within their financial account. Method of payment can be bank account, credit card or other electronic payment services. The registration may occur through a secure network interface on the device, the financial network's website, a call service center or directly through a registered service provider for the financial network. Once the account is created, the account can be updated as necessary by the owner through commercially acceptable means. All financial information is not stored on the device but is managed through a secure back office system operated by the financial network.

At any time after the account is created, the owner may register one or more vehicles for vehicle transactions. Vehicles may be registered using license plates, Vehicle Identification Number or other electronic means such as passive or active radio frequency transmitters. For additional confirmation of license plates, the application allows the device owner to take a picture of the license plate for comparison in electronic tolls if a camera feature is available. The license plate image may be used for verification of electronic charges made with the vehicle. The application will allow an expiration date on each vehicle to allow temporary access such as when a consumer has a short term need such as a rental car.

Account Management

The application, when installed on the device, allows the customer to securely interact with the financial network account associated with the application. The customer may modify payment options, activate and deactivate vehicles, authorize payments or view their account history. The application may store account identity information through a variety of means including account passcodes, hardware or software generated tokens, an X509 or similar digital certificate.

In one embodiment, the application receives information from the financial network containing vehicle payment systems such as toll facilities and parking systems and receive rates from each system. These system locations and rates will be transmitted to the device on demand or as an automatic update. The toll access locations and rates may be reviewed directly through the application.

The application can be used to set preferred financial accounts such as credit card or bank account for each vehicle. The application may also use time and day ranges to associate an account with a vehicle. The application can add temporary vehicles such as rental cars to the financial network account with an active range of dates and times. The application can associate specific toll systems to different financial accounts. The user can set the application to automatically approve transactions for specific combinations of vehicles, toll systems and date time ranges. The application communicates directly to the financial network when messages can be sent and acknowledged. The application will retain customer preferences until the financial network can be accessed and messages are sent and acknowledged. The application retains customer preferences for direct interaction when a message cannot be sent or received to the financial network.

Transaction Process

Transaction authorization and processing may take two forms, an active process and a passive process. The active process involves use of the geolocation system on the device which is independent of the toll facility and the application. When the device approaches a supported toll system, a "pre-authorization" alert will be activated on the screen and an audible notification will be made. The audible notification could include a verbal announcement of the tolling site name and a request for payment authorization. The audible notification could be a rhythmic sound such as a ringtone to announce the request for payment authorization. The authorization may be made by voice if voice control is enabled on the device or through a button press or other manual interaction with the personal electronic device housing the application. The device will record the transaction with the toll system and an authorization event if it is provided and submit the information electronically to the financial network when communications are available. Payment processing will be coordinated directly between the tolling system and financial network but the method of payment is determined through the application.

The passive process involves tolling after-the-fact. This may occur if the device was not present in the vehicle or was not activated at the time the toll occurred. The toll system will detect the vehicle though electronic or manual methods and match the vehicle to the financial account using the vehicle license plate, radio frequency transmitter, or other automatic or manual vehicle identification system. The toll system will submit an electronic request for authorization through the financial network which communicates to the user through the application. The application communicates the appropriate financial account based on the time the transaction occurred and when the vehicle was active on the account if configured on the application. The application provides the consumer an electronic message, either audibly, visually or both, with details of one or more transactions for approval. The consumer may actively accept payment or dispute the payment through the application. The application will update the financial networks records through an electronic message.

Reconciliation Process

Once payment is approved, the account holder's financial account will be charged for the toll transactions based on the contracted rates. Financial reconciliation and settlement of the transactions will be made between financial network and the toll system. The application has the ability to compare transaction times with vehicle activation periods so temporary access vehicles are processed against the appropriate account. Electronic transaction records will be made available to all parties in the financial transaction including the consumer and the toll system. The information may be made available through the application if configured by the user.

Disputes may occur if the device owner decides to dispute the transaction. The license plate image captured by the phone may be used by the financial network to verify that the transaction vehicle matches the registered account. This provides an additional method of verification for payment. The financial network may communicate the dispute resolution to the consumer through the application or by other methods.

In one embodiment of the invention, the customer downloads the invention from a provisioner for their personal electronic device. The application provides a registration process for linking financial accounts to the financial network tied to the customer's account. The application accepts customer information and financial account information and securely transmits to the financial network. The customer enters more than one account such as a credit card, bank account. The customer enters license plate information for several personally owned vehicles and associates each with a financial account using the application. The application submits this vehicle and account registration to the financial network. The customer drives toward a toll entry point and the personal electronic device containing the application announces the approaching toll authority. The customer accepts the impending toll through the device using voice command or button press. The application communicates the authorization to the financial network which settles payment with the toll system.

In another embodiment, the customer has registered with the financial network using the application. The customer may have a credit card, bank account and/or a stored value account with the toll system. The customer uses the toll system and, for example, has preselected the bank account to pay for tolls. The toll system detects the license plate and requests payment from the financial network the day after the toll occurs. The financial network sends the request for payment authorization to the customer's personal electronic device. The customer authorizes payment with the default account which is the registered bank account. The financial network settles the transaction with the toll system and charges customer's bank account for the toll.

In another embodiment, the customer registers with the financial network using the application. The customer has, for example, a credit card and bank account registered on the financial network. The customer uses the toll system and has preselected the bank account to pay for tolls. The toll system detects the license plate and requests payment from the financial network the day after the toll occurs. The financial network sends the request for payment authorization to the customer's personal electronic device. The customer responds by changing the method of payment to the credit card account and authorizes payment for the transaction. The financial network settles the transaction with the toll system and charges customer's credit card for the toll.

In another embodiment, the customer has registered with the financial network using the application. The customer has a credit card and bank account registered on the financial network. The customer rents a car and adds the car's license plate to application with an expiration date 3 days later. The application notifies the financial network of the addition. The customer uses a toll system and has preselected the bank account to pay for tolls. The toll system detects the license plate for the rental car and requests payment from the financial network the day after the toll occurs which is after the rental car is returned. The financial network sends the request for payment authorization to the application and the personal electronic device notifies the customer. The application notifies the user of the rental car period and that the transaction occurred when the car was active with the application. The customer authorizes payment with the default account which is the registered bank account. The financial network settles the transaction with the toll system and charges customer's bank account for the toll.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of transportation payment systems, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for making payments, comprising:
   providing, by one or more processors, an application to customers for installation on a personal electronic device;
   registering an owner of said device using a telephone number or manufacturer's serial number of said device;
   registering, by said one or more processors, a customer's vehicle's license plate and financial account information with a financial network, wherein said financial network is a network providing services specifically for toll facilities and not a cellular phone carrier, and wherein said financial network is communicatively connected to vehicle license plate detection device that is located within a toll facility;
   detecting, through said vehicle license plate detection device, said customer's vehicle's license plate at said toll facility;
   paying a toll charge for said customer's use of said toll facility by debiting said customer's financial account and paying said toll facility;
   notifying said customer through said application that said customer has paid said toll charge and has the option to dispute said toll charges;
   upon the customer's successful dispute of said toll charges, crediting said customer's financial account and receiving a credit from said toll facility.

2. The method of claim 1, wherein said toll facility is a parking facility.

3. The method of claim 1, wherein said registration is performed online by said customer.

4. The method of claim 1, wherein said customer receives said notification on said customer's personal electronic device.

5. The method of claim 1, wherein, at the time of registration or thereafter, said customer designates a financial account for processing said payment when utilizing said toll facility during certain periods of time and designates another financial account for processing said payment when utilizing said toll facility during other periods.

6. The method of claim 1, wherein when said financial account is closed or contains insufficient funds to make said payment, said payment is made through another account designated by said customer.

7. The method of claim 1, further including registering a date on which said paying fees for said customer's use of said toll facility by debiting said customer's financial account and paying said toll facility commences and a date on which said paying fees for said customer's use of said toll facility by debiting said customer's financial account and paying said toll facility stops.

8. The method of claim 1, wherein said application is configured so that said customer may take a picture of said customer's license plate for verification of said use of said toll facility.

9. The method of claim 1, wherein said application is configured to display toll access locations and rates.

10. The method of claim 1, wherein upon receipt of said customer's dispute of said toll charges, a photograph of said license plate taken as customer's vehicle approached said toll is transmitted to said device.

11. The method of claim 1, wherein said personal electronic device is not present in said vehicle while said vehicle is at said toll facility.

12. The method of claim 1, wherein said personal electronic device is not activated while said vehicle is at said toll facility.

13. A method for making payments, comprising:
   Providing, by one or more processors, an application to customers for installation on a personal electronic device;
   registering, by said one or more processors, a customer's vehicle's license plate and financial account information with a financial network, wherein said financial network is a network providing services specifically for toll facilities and not a cellular phone carrier, and wherein said financial network is communicatively connected to vehicle license plate detection device within a toll facility;
   detecting, through said vehicle license plate detection service, said customer's vehicle's license plate at said toll facility;
   contacting said financial network with instructions to pay a toll charge for said customer's use of said toll facility by debiting said customer's financial account and paying said toll facility;
   notifying said customer through said application that said customer has paid said toll charge and has the option to dispute said toll charges; and
   upon the customer's successful dispute of said toll charges, crediting said customer's financial account and receiving a credit from said toll facility.

14. The method of claim 13, wherein said personal electronic device is not present in said vehicle while said vehicle is at said toll facility.

15. The method of claim 13, wherein said personal electronic device is not activated while said vehicle is at said toll facility.

16. A method for making payments, comprising:
- providing, by one or more processors, an application to customers for installation on a personal electronic device;
- registering the owner of said device using the telephone number or manufacturer's serial number of said device;
- registering, by said one or more processors, a customer's vehicle's license plate and financial account;
- detecting said customer at said toll using said device's geolocation system;
- paying fees for said customer's use of said toll facility by debiting said customer's financial account and paying said toll facility;
- notifying said customer through said application that said customer has paid said toll charge and has the option to dispute said toll charges;
- upon the customer's successful dispute of said toll charges, crediting said customer's financial account and receiving a credit from said toll facility.

* * * * *